(12) United States Patent
Yamane et al.

(10) Patent No.: US 10,179,412 B2
(45) Date of Patent: Jan. 15, 2019

(54) WORKPIECE CONVEYING SYSTEM

(71) Applicant: KAWASAKI JUKOGYO KABUSHIKI KAISHA, Kobe-shi, Hyogo (JP)

(72) Inventors: Hideshi Yamane, Kakogawa (JP); Jun Takebayashi, Kakogawa (JP); Shuhei Kuraoka, Akashi (JP); Tatsuhiro Uto, Akashi (JP); Shinichi Fujisawa, Ashiya (JP); Mitsunobu Oka, Kobe (JP); Hiroyuki Mizumoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/576,302

(22) PCT Filed: May 16, 2016

(86) PCT No.: PCT/JP2016/002383
§ 371 (c)(1),
(2) Date: Nov. 22, 2017

(87) PCT Pub. No.: WO2016/189822
PCT Pub. Date: Dec. 1, 2016

(65) Prior Publication Data
US 2018/0147730 A1 May 31, 2018

(30) Foreign Application Priority Data
May 22, 2015 (JP) ................................ 2015-104697

(51) Int. Cl.
B25J 15/10 (2006.01)
B25J 15/00 (2006.01)
B25J 15/08 (2006.01)

(52) U.S. Cl.
CPC ....... *B25J 15/0033* (2013.01); *B25J 15/0038* (2013.01); *B25J 15/08* (2013.01); *B25J 15/103* (2013.01); *Y10S 901/30* (2013.01)

(58) Field of Classification Search
CPC ............... B25J 15/0033; B25J 15/0038; B25J 15/0095; B25J 15/0253; B25J 15/103; B25J 15/08; Y10S 901/30; Y10S 901/39
(Continued)

(56) References Cited

U.S. PATENT DOCUMENTS 2,489,864 A * 11/1949 Cravener .................. B66C 1/10
294/119.1
4,368,913 A * 1/1983 Brockmann ......... B25J 15/0266
294/106
(Continued)

FOREIGN PATENT DOCUMENTS

JP H07-156086 A 6/1995
WO WO-2012101953 A1 * 8/2012 .......... B25J 15/0023

Primary Examiner — Dean J Kramer
(74) Attorney, Agent, or Firm — Oliff PLC

(57) ABSTRACT

A workpiece conveying system is provided, which includes a workpiece including a workpiece main body, a cylindrical gripping part protruding from the workpiece main body, and an engaging plate attached to a tip-end surface of the gripping part, a chuck device including three jaws configured to grip the gripping part in radial directions of the gripping part, and a robot to which the chuck device is attached. The engaging plate includes an overhang part protruding from the gripping part along the tip-end surface of the gripping part, and an engaging slot, into which one of the three jaws fits, is formed in the overhang part.

4 Claims, 7 Drawing Sheets

(58) Field of Classification Search
USPC .................................................. 294/119.1
See application file for complete search history.

(56) References Cited

U.S. PATENT DOCUMENTS

| | | | | |
|---|---|---|---|---|
| 4,697,839 | A * | 10/1987 | Fischer ................ | B25J 15/0266 |
| | | | | 294/115 |
| 6,857,174 | B2 * | 2/2005 | Morita .................... | B23P 19/02 |
| | | | | 29/240 |
| 7,648,183 | B2 * | 1/2010 | Cornwell .................. | B66C 1/62 |
| | | | | 294/90 |
| 2013/0313791 | A1 * | 11/2013 | Setrakian ............. | B25J 15/0019 |
| | | | | 279/143 |
| 2014/0106386 | A1 * | 4/2014 | Umeno .............. | G01N 35/0099 |
| | | | | 435/23 |
| 2014/0125080 | A1 * | 5/2014 | Dan .................... | B25J 15/0019 |
| | | | | 294/213 |

* cited by examiner

WORKPIECE CONVEYING SYSTEM

TECHNICAL FIELD

The present disclosure relates to a workpiece conveying system using a robot.

BACKGROUND ART

Conventionally, workpiece conveying systems using a robot have been proposed. For example, Patent Document 1 discloses a workpiece conveying system in which a chuck device is attached to a robot. In Patent Document 1, the chuck device has a pair of jaws (or dogs) which hold a cylindrical workpiece by workpiece contact surfaces where a V-shaped dent is formed, respectively. Note that some chuck devices may have three jaws with flat workpiece contact surfaces.

REFERENCE DOCUMENT OF CONVENTIONAL ART

Patent Document

[Patent Document 1] JP1995-156086A

DESCRIPTION OF THE DISCLOSURE

Problem to be Solved by the Disclosure

Meanwhile, some workpieces are of relatively large size. When conveying such a workpiece with the robot, a cylindrical gripping part may be provided to a main body of the workpiece, and the gripping part may be gripped by the three jaws of the chuck device.

However, if structured as such, the center of gravity of the workpiece main body may not be located at the center of the gripping part. Thus, when the workpiece is conveyed by the robot, a rotational force (or torque) around the gripping part acts on the workpiece according to a force of inertia at the time of acceleration or deceleration. Thus, the workpiece may rotate (i.e., the workpiece cannot be conveyed to a normal position) only by holding the gripping part by the three jaws.

Therefore, the purpose of the present disclosure is to provide a workpiece conveying system, which prevents rotation of a workpiece when the workpiece including a workpiece main body and a gripping part is conveyed by a robot.

SUMMARY OF THE DISCLOSURE

In order to solve the problem, according to one aspect of the present disclosure, a workpiece conveying system is provided, which includes a workpiece including a workpiece main body, a cylindrical gripping part protruding from the workpiece main body, and an engaging plate attached to a tip-end surface of the gripping part, a chuck device including three jaws configured to grip the gripping part in radial directions of the gripping part, and a robot to which the chuck device is attached. The engaging plate includes an overhang part protruding from the gripping part along the tip-end surface of the gripping part, and an engaging slot, into which one of the three jaws fits, is formed in the overhang part.

With this structure, by one of the jaws of the chuck device fitting into the engaging slot of the engaging plate, rotation of the workpiece is prevented. In addition, the above effect is acquired with a simple structure of attaching the engaging plate to the gripping part.

The engaging plate may have a shape so that the overhang part protrudes from the gripping part only toward one of the three jaws and is located within the contour of the gripping part in an area corresponding to other two jaws. With this structure, the engaging plate is minimized.

For example, the robot may include an articulated arm with a plurality of degrees of freedom.

Effect of the Disclosure

According to the present disclosure, the rotation of the workpiece is prevented when the workpiece including the workpiece main body and the gripping part is conveyed by the robot.

MODES FOR CARRYING OUT THE DISCLOSURE

Figure 1:
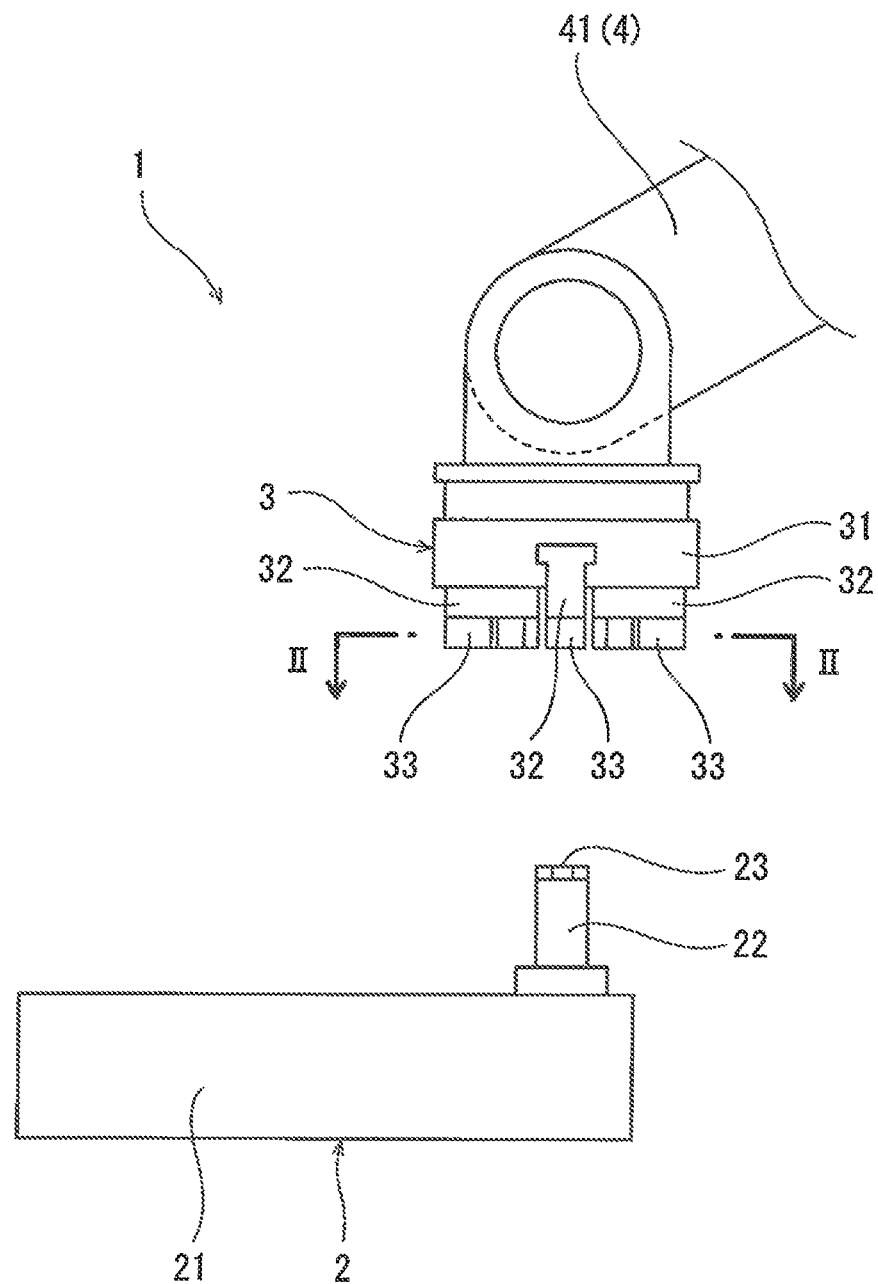
FIG. 1 is a side view of a workpiece conveying system according to one embodiment of the present disclosure.

FIG. 1 illustrates a workpiece conveying system 1 according to one embodiment of the present disclosure. The workpiece conveying system 1 includes a workpiece 2 and a robot 4 which conveys the workpiece 2.

The workpiece 2 includes a workpiece main body 21, a cylindrical gripping part 22 which protrudes from the workpiece main body 21, and an engaging plate 23 attached to a tip-end surface 22a (see FIG. 3) of the gripping part 22. In this embodiment, the workpiece main body 21 has a plate shape, and the gripping part 22 protrudes in thickness directions of the workpiece main body 21 from near an edge of the workpiece main body 21. Moreover, the tip-end surface 22a of the gripping part 22 is perpendicular to the center axis of the gripping part 22, and the engaging plate 23 is parallel to the tip-end surface 22a of the gripping part 22.

In this embodiment, the robot 4 includes an articulated arm 41 with a plurality of degrees of freedom. A chuck device 3 is attached to the articulated arm 41. Note that the robot 4 is not limited to the robot including the articulated arm 41, but may be a uniaxial robot like a linear actuator, for example.

Figure 2:
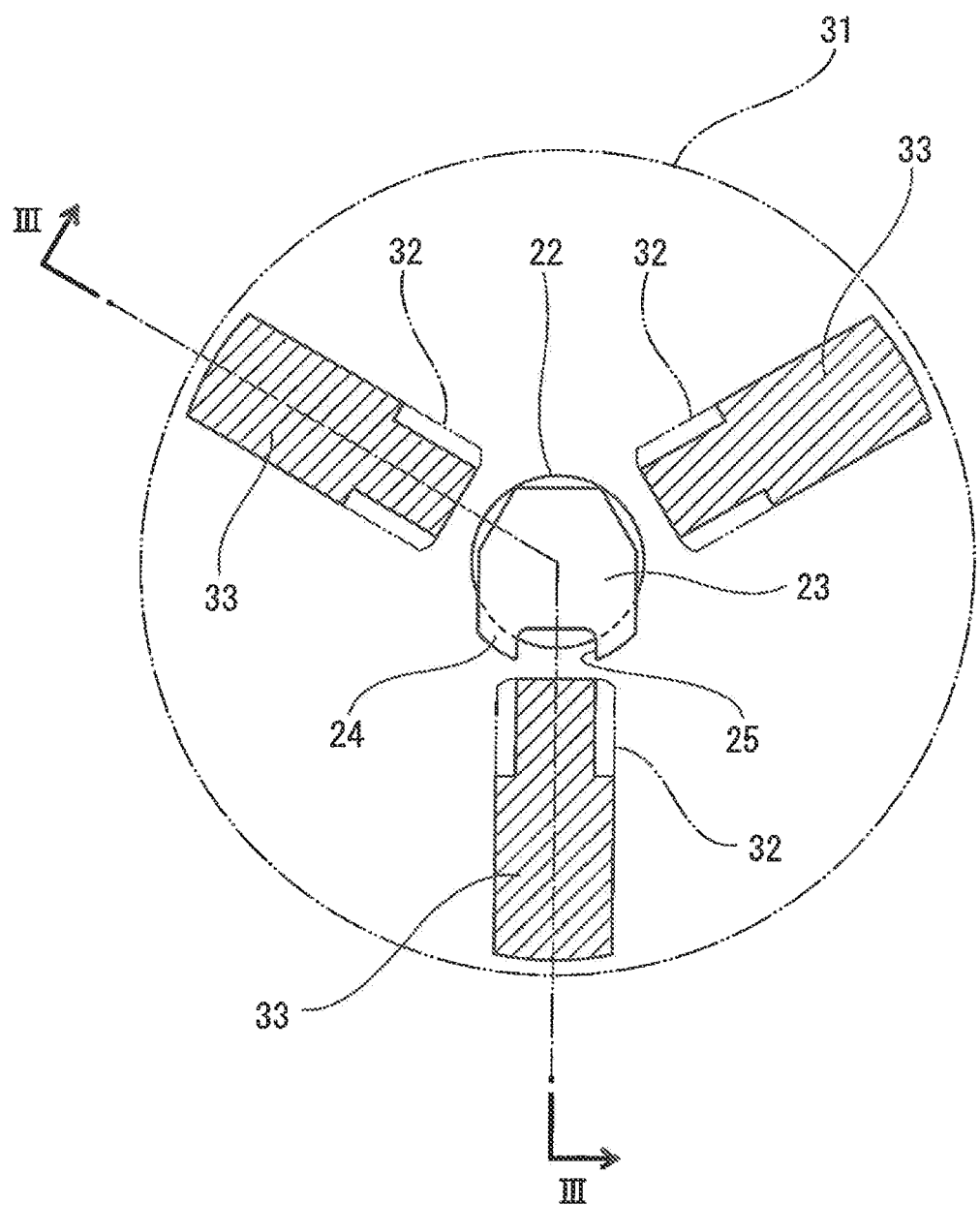
FIG. 2 is a cross-sectional plan view taken along a line II-II of FIG. 1 immediately before a chuck device grips a gripping part of a workpiece.

As illustrated in FIGS. 1 and 2, the chuck device 3 includes three jaws 33 which grips the gripping part 22 in radial directions of the gripping part 22, three slide blocks 32 to which the jaws 33 are fixed, and a chuck main body 31 which supports the slide blocks 32. Three slots are formed in the chuck main body 31 so that they radially extend from the center of the chuck main body 31 and are formed at intervals of 120 degrees. The slide blocks 32 are fitted into the slots.

Each jaw 33 has substantially the same shape as the slide block 32. Note that an inner end part of each jaw 33 is tapered in the radial direction of the chuck main body 31 so that a width of the inner end part is narrower than a width of the slide block 32. One of the three jaws 33 also serves as a jaw for preventing rotation (a lower jaw in FIG. 2).

Figure 3:
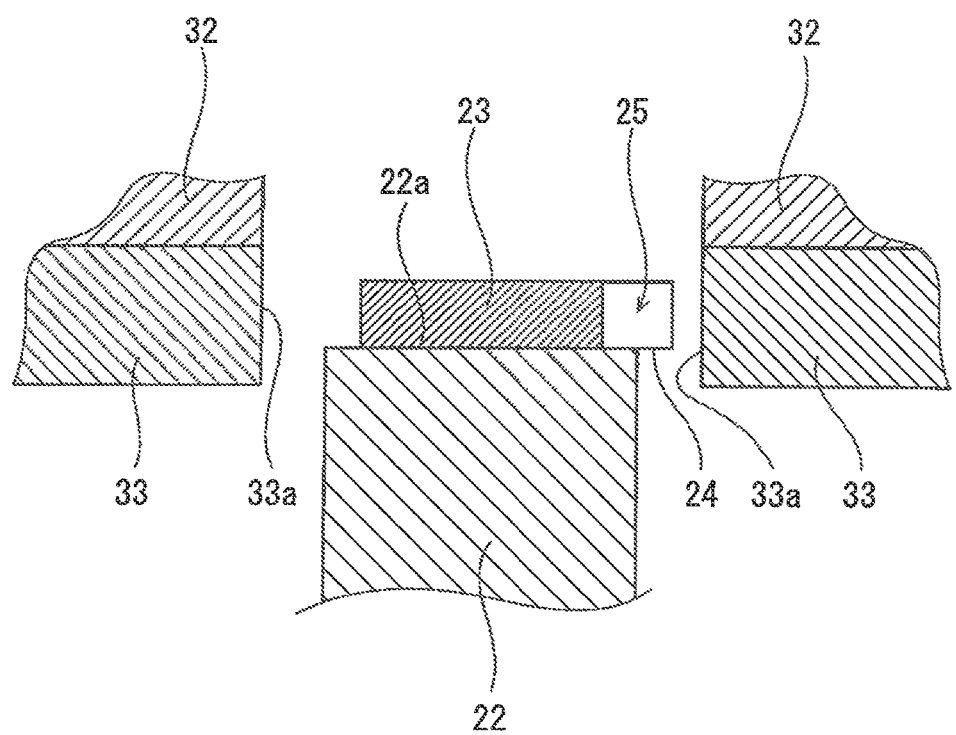
FIG. 3 is a cross-sectional side view taken along a line III-III of FIG. 2.

As illustrated in FIG. 3, each jaw 33 has a flat workpiece contact surface 33a perpendicular to the radial direction of the chuck main body 31. In this embodiment, the chuck device 3 grips the gripping part 22 in a state where the tip-end surface 22a of the gripping part 22 is located at an intermediate position of the workpiece contact surface 33a. That is, the jaws 33 hold a portion adjacent to the tip-end surface 22a of the gripping part 22.

As illustrated in FIG. 2, the engaging plate 23 described above includes an overhang part 24 protruding from the gripping part 22 along the tip-end surface 22a of the gripping part 22. In this embodiment, the overhang part 24 has such a shape that the engaging plate 23 protrudes only toward one of the three jaws 33 (the lower jaw in FIG. 2) from the gripping part 22, while the engaging plate 23 is located inside the contour of the gripping part 22 in an area corresponding to other two jaws 33.

An engaging slot 25 is formed in the overhang part 24 so that one of the three jaws 33 (the jaw for preventing the rotation) fits into the engaging slot 25. A width of the engaging slot 25 is substantially equal to the width of the inner end part of the rotation preventing jaw 33. In this embodiment, a depth of the engaging slot 25 in the radial direction of the gripping part 22 is larger than a distance from the gripping part 22 to a tip end of the overhang part 24. Thus, part of the tip-end surface 22a of the gripping part 22 is exposed upwardly through the engaging slot 25.

In the workpiece conveying system 1 described above, when the robot 4 conveys the workpiece 2, the articulated arm 41 moves the chuck device 3 immediately above the gripping part 22. The articulated arm 41 then lowers the chuck device 3 and inserts an upper end part of the gripping part 22 into the three jaws 33. Thus, a spatial relationship between the three jaws 33 and the engaging plate 23 becomes as illustrated in FIGS. 2 and 3.

Figure 4:
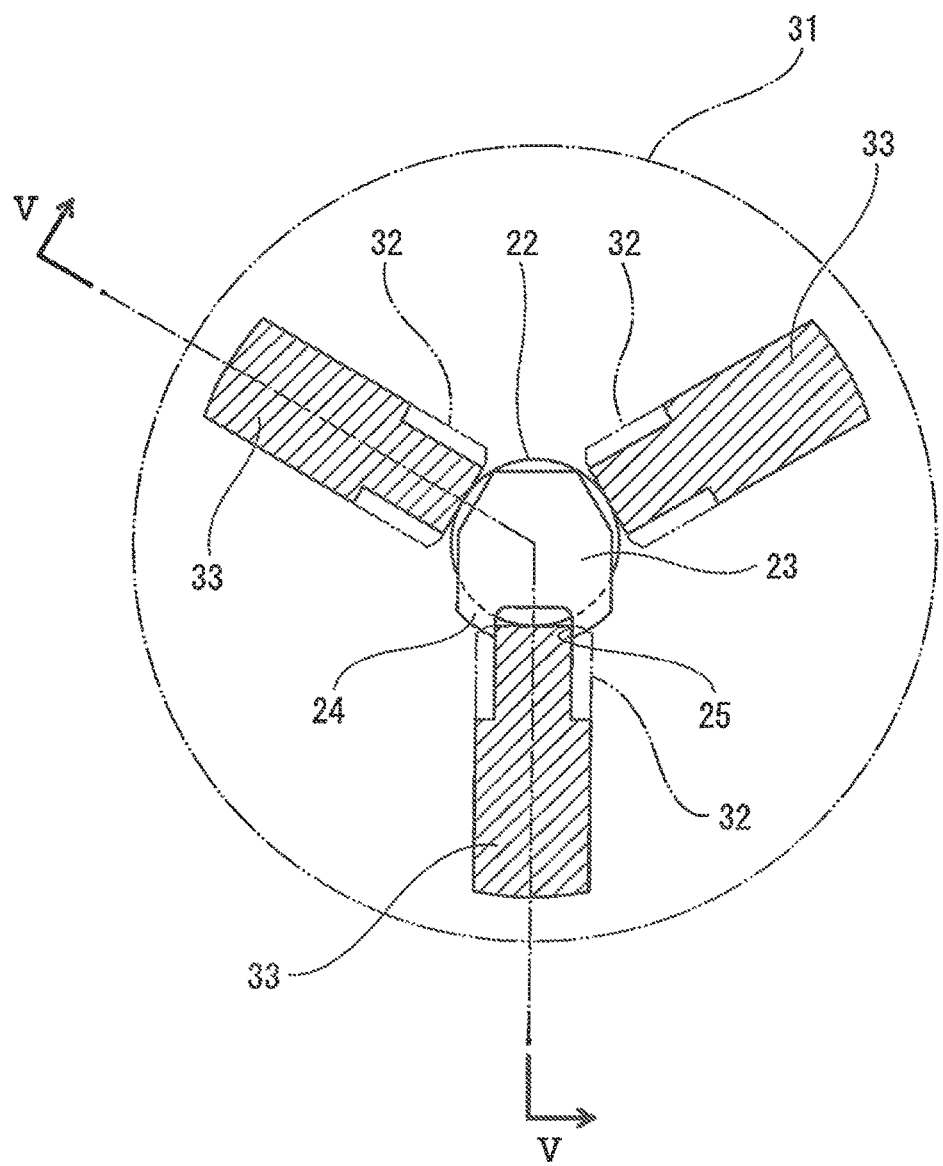
FIG. 4 is a cross-sectional plan view taken along a line II-II of FIG. 1 immediately after the chuck device grips the gripping part of the workpiece.
Figure 5:
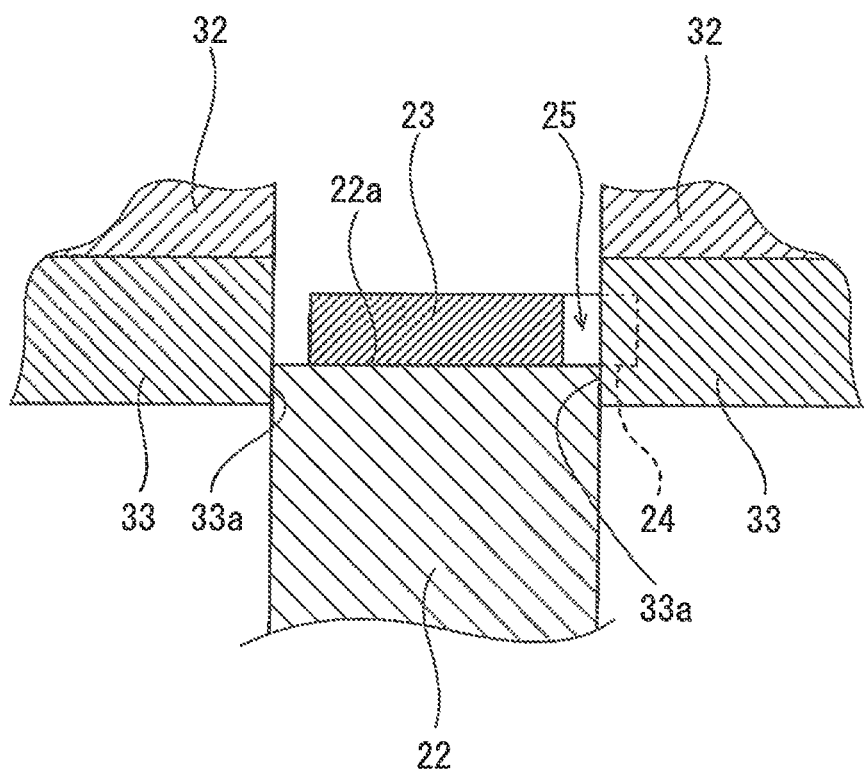
FIG. 5 is a cross-sectional side view taken along a line V-V of FIG. 4.

The chuck device 3 then moves the three jaws 33 radially inward together with the slide blocks 32. Thus, the spatial relationship between the three jaws 33 and the engaging plate 23 becomes as illustrated in FIGS. 4 and 5. That is, the lower jaw 33 fits into the engaging slot 25 of the engaging plate 23 in FIG. 2. Thus, in FIG. 2, the lower jaw 33 also functions as a jaw for positioning. Moreover, since the three jaws 33 synchronizedly move radially inward, the center of the gripping part 22 automatically matches with the center of the chuck main body 31 by the radially-inward movement of the three jaws.

Thus, the rotation of the workpiece 2 is prevented by one jaw 33 of the chuck device 3 fitting into the engaging slot 25 of the engaging plate 23. In addition, the above effect is acquired with a simple structure of attaching the engaging plate 23 to the gripping part 22. Especially, if the robot 4 includes the articulated arm 41 like this embodiment, the above effect is notably acquired because a force of inertia acts on the workpiece 2 not only at the time of acceleration and deceleration of conveyance but also at the time of rotation of the workpiece 2.

Furthermore, since only one engaging slot 25 is formed for the three jaws 33, tolerances of the width of the engaging slot 25 and the width of the rotation preventing jaw 33 can be more strict (i.e., those widths are matched with high precision). As a result, the rotation of the workpiece 2 is prevented very effectively.

Modifications

The present disclosure is not limited to the embodiment described above but various modifications are possible without departing from the spirit of the present disclosure.

Figure 6:
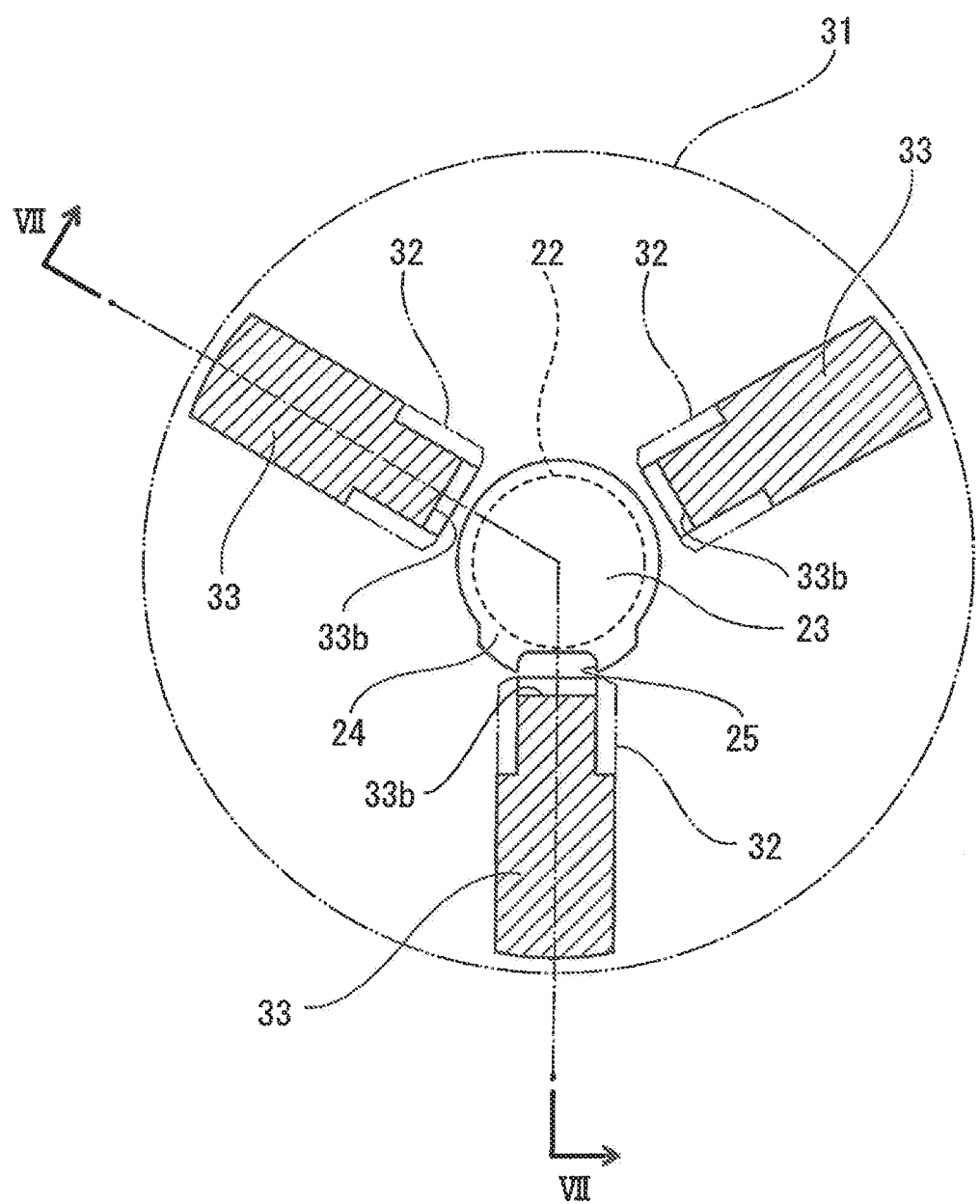
FIG. 6 is a cross-sectional plan view of a workpiece conveying system of a modification.
Figure 7:
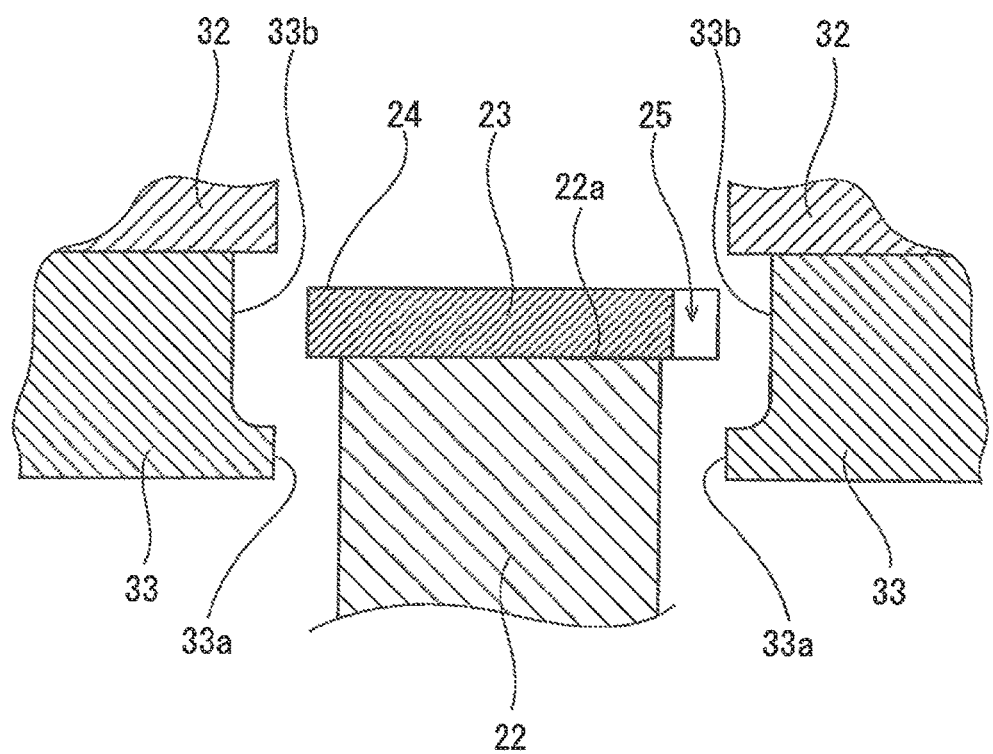
FIG. 7 is a cross-sectional side view taken along a line VII-VII of FIG. 6.

For example, as illustrated in FIGS. 6 and 7, each jaw 33 may have the workpiece contact surface 33a which contacts a side surface of the gripping part 22 below the tip-end surface 22a of the gripping part 22, and may have a recess 33b above the workpiece contact surface 33a. In other words, the jaw 33 may grip a portion of the gripping part 22 which is distant from the tip-end surface 22a. In such a case, as illustrated in FIG. 6, the overhang part 24 may protrude from the gripping part 22 throughout its circumference. Note that the engaging plate 23 is minimized if the overhang part 24 protrudes from the gripping part 22 only in one direction similar to the embodiment described above.

DESCRIPTION OF REFERENCE CHARACTERS

1 Workpiece Conveying System
2 Workpiece
21 Workpiece Main Body
22 Gripping Part.
22a Tip-end Surface
23 Engaging Plate
24 Overhang Part
25 Engaging Slot
3 Chuck Device
33 Jaw
4 Robot
41 Articulated Arm

What is claimed is:

1. A workpiece conveying system, comprising:
  a workpiece including a workpiece main body, a cylindrical gripping part protruding from the workpiece main body, and an engaging plate attached to a tip-end surface of the gripping part;
  a chuck device including three jaws configured to grip the gripping part in radial directions of the gripping part; and
  a robot to which the chuck device is attached,
  wherein the engaging plate includes an overhang part protruding from the gripping part along the tip-end surface of the gripping part, and an engaging slot, which opens outward in the radial directions of the cylindrical gripping part and into which one of the three jaws fits, is formed in the overhang part.

2. A workpiece conveying system, comprising:
  a workpiece including a workpiece main body, a cylindrical gripping part protruding from the workpiece main body, and an engaging plate attached to a tip-end surface of the gripping part;
  a chuck device including three jaws configured to grip the gripping part in radial directions of the gripping part; and
  a robot to which the chuck device is attached,
  wherein the engaging plate includes an overhang part protruding from the gripping part along the tip-end surface of the gripping part, and an engaging slot, into which one of the three jaws fits, is formed in the overhang part, and wherein the engaging plate has a shape so that the overhang part protrudes from the gripping part only toward one of the three jaws and is located within the contour of the gripping part in an area corresponding to other two jaws.

3. The workpiece conveying system of claim 1, wherein the robot includes an articulated arm with a plurality of degrees of freedom.

4. The workpiece conveying system of claim 2, wherein the robot includes an articulated arm with a plurality of degrees of freedom.

\* \* \* \* \*